United States Patent
Huerta et al.

(10) Patent No.: US 7,720,684 B2
(45) Date of Patent: May 18, 2010

(54) METHOD, APPARATUS, AND COMPUTER PROGRAM PRODUCT FOR ONE-STEP CORRECTION OF VOICE INTERACTION

(75) Inventors: Juan Manuel Huerta, Bronx, NY (US); Roberto Pieraccini, Peekskill, NY (US)

(73) Assignee: Nuance Communications, Inc., Burlington, MA (US)

( * ) Notice: Subject to any disclaimer, the term of this patent is extended or adjusted under 35 U.S.C. 154(b) by 1162 days.

(21) Appl. No.: 11/117,951

(22) Filed: Apr. 29, 2005

(65) Prior Publication Data

US 2006/0247913 A1 Nov. 2, 2006

(51) Int. Cl.
*G10L 15/00* (2006.01)
*G10L 21/00* (2006.01)

(52) U.S. Cl. .................. 704/257; 704/231; 704/270; 704/270.1; 704/275

(58) Field of Classification Search .......... 704/201, 704/275, 270.1, E15.022, E15.04, E15.044, 704/257, 231, 270
See application file for complete search history.

(56) References Cited

U.S. PATENT DOCUMENTS

| | | | | |
|---|---|---|---|---|
| 6,314,402 | B1* | 11/2001 | Monaco et al. | 704/275 |
| 7,228,278 | B2* | 6/2007 | Nguyen et al. | 704/257 |
| 7,299,185 | B2* | 11/2007 | Falcon et al. | 704/270 |
| 2003/0105634 | A1* | 6/2003 | Abella et al. | 704/257 |
| 2004/0085162 | A1* | 5/2004 | Agarwal et al. | 333/196 |
| 2005/0010393 | A1* | 1/2005 | Danieli et al. | 704/9 |
| 2005/0027536 | A1* | 2/2005 | Matos et al. | 704/270.1 |
| 2005/0055205 | A1* | 3/2005 | Jersak et al. | 704/233 |
| 2005/0080629 | A1* | 4/2005 | Attwater et al. | 704/275 |
| 2005/0096913 | A1* | 5/2005 | Coffman et al. | 704/275 |
| 2005/0105712 | A1* | 5/2005 | Williams et al. | 379/265.02 |
| 2005/0283764 | A1* | 12/2005 | Chiu | 717/125 |
| 2006/0095267 | A1* | 5/2006 | Yano et al. | 704/275 |
| 2006/0143007 | A1* | 6/2006 | Koh et al. | 704/243 |
| 2006/0247931 | A1* | 11/2006 | Caskey et al. | 704/270 |
| 2008/0183470 | A1* | 7/2008 | Caskey et al. | 704/252 |

FOREIGN PATENT DOCUMENTS

JP 2004271909 A * 9/2004

OTHER PUBLICATIONS

K. Papineni, S. Roukos, and T. Ward (1999) Free-Flow Dialog Management Using Forms. Proc. Eurospeech, pp. 1411-1414.*

(Continued)

*Primary Examiner*—David R Hudspeth
*Assistant Examiner*—Edgar Guerra-Erazo
(74) *Attorney, Agent, or Firm*—Wolf, Greenfield & Sacks, P.C.

(57) ABSTRACT

A one-step correction mechanism for voice interaction is provided. Correction of a previous state is enabled simultaneously with recognition in a current or subsequent state. An application is decomposed into a set of tasks. Each task is associated with the collection of one piece of information. Each task may be in a different state. At any point during the interaction, while a task/state pair is active, the dialog manager may enable multiple other task/state pairs to be active in latent fashion. The application developer may then use those facilities or resources to the active task/state and the latent task/state pairs depending on contextual condition of the interaction state of the application.

18 Claims, 5 Drawing Sheets

OTHER PUBLICATIONS

McTear, M.F. Modelling Spoken Dialogues with State Transition Diagrams: Experiences with the CSLU Toolkit. In Proceedings of 5th International Conference on Spoken Language Processing (ICSLP'98). Sydney, Australia, Dec. 1998.*

Goldberg, J., Ostendorf, M., and Kirchhoff, K., 2003—The Impact of Response Wording in Error Correction Subdialogs. in Proceedings of ISCA Workshop on Error Handling in Spoken Dialogue Systems. Chateaux d'Oex, Switzerland.*

Pieraccini, R., Caskey, S., Dayanidhi, K., Carpenter, B., Phillips, M.: Etude, A Recursive Dialog Manager with Embedded User Interface Patterns. In: Automatic Speech Recognition and Understanding Workshop. (2001).*

EIC_Search_report_11117951.*

Akolkar, "Reusable Dialog Components (RDC) Tag Library", The Jakarta Project, http://jakarta.apache.org/taglibs/sandbox/doc/rdc-doc/intro.html, 2000, 3 pages.

* cited by examiner

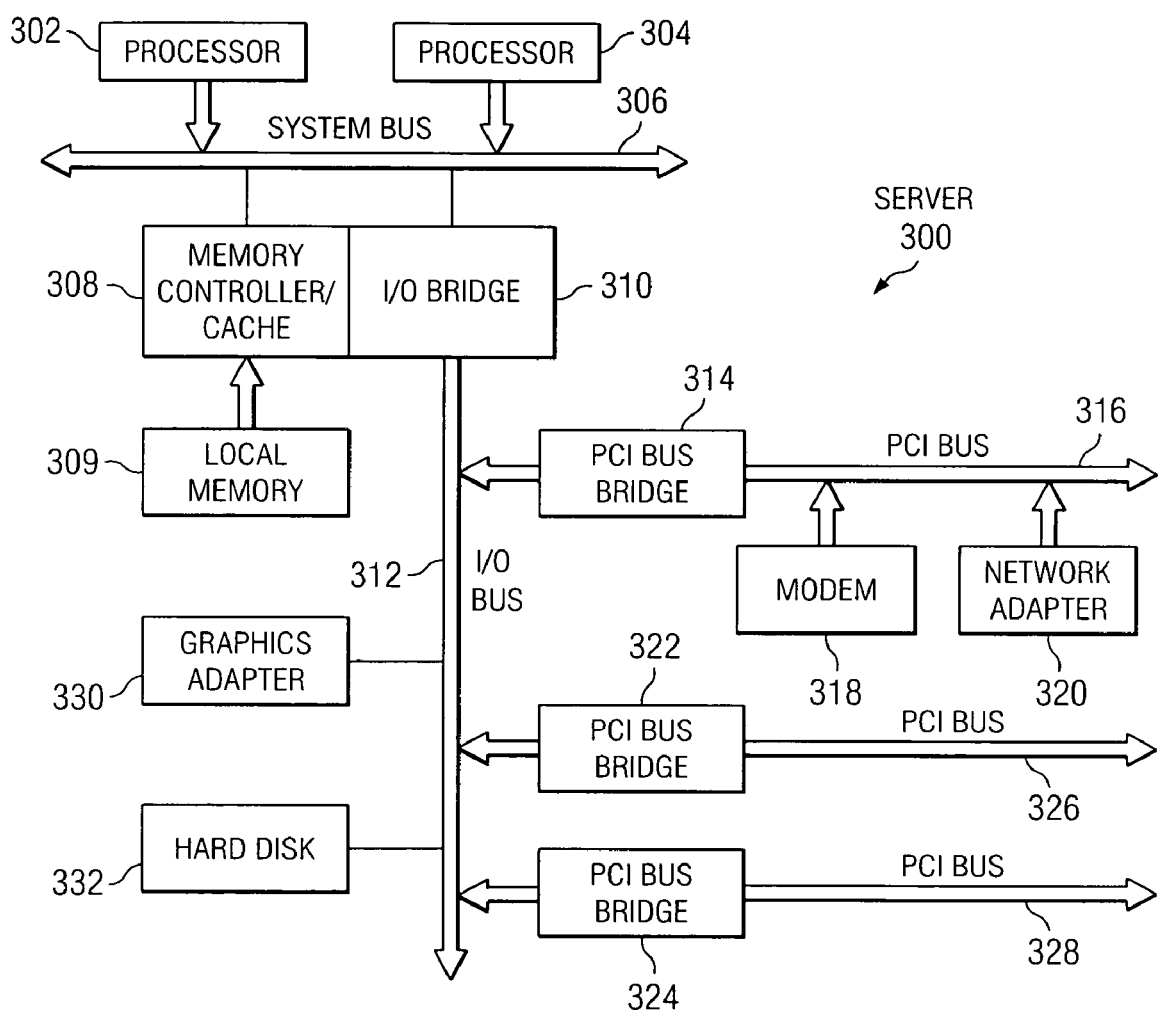

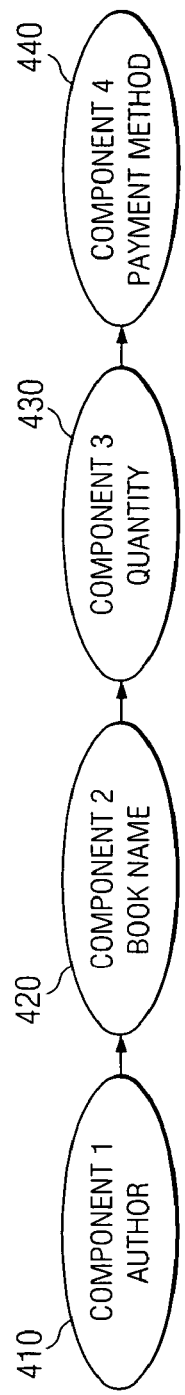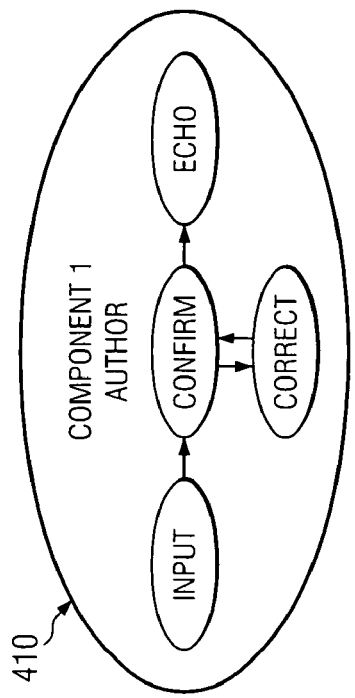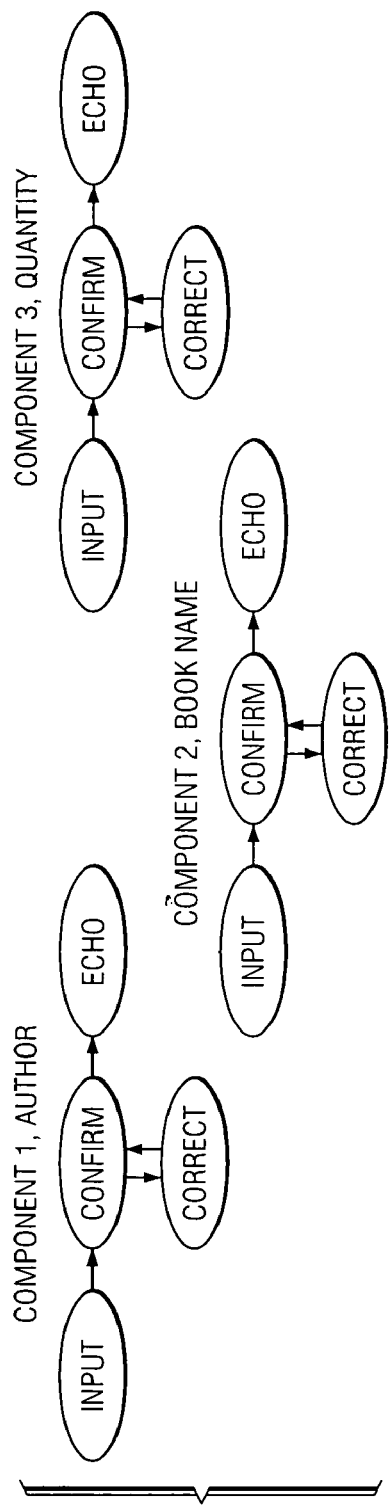
FIG. 4A
FIG. 4B
FIG. 4C

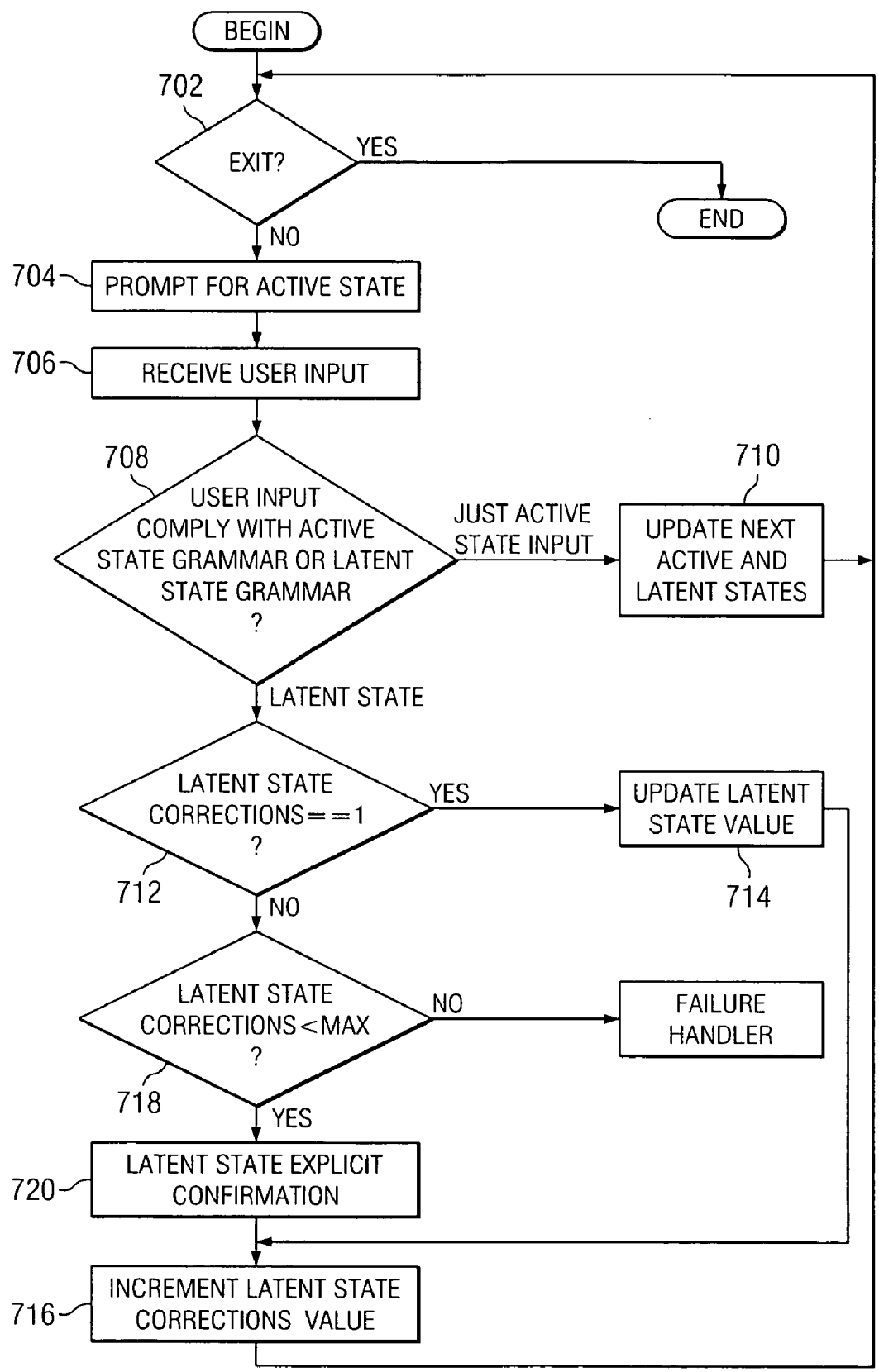

METHOD, APPARATUS, AND COMPUTER PROGRAM PRODUCT FOR ONE-STEP CORRECTION OF VOICE INTERACTION

BACKGROUND OF THE INVENTION

1. Technical Field

The present invention relates to data processing and, in particular, to computer voice interaction. Still more particularly, the present invention provides one-step correction of voice interaction.

2. Description of Related Art

An interactive voice response (IVR) system is an automated telephone information system that speaks to the caller with a combination of fixed voice menus and realtime data from databases. The caller responds by speaking words or short phrases. Applications may include, for example, bank-by-phone, flight-scheduling information, and automated order entry and tracking. IVR systems allow callers to get needed information without the expense of employing call centers with human operators. IVR systems may also used as a front end to call centers in order to offload as many calls as possible to costly human agents.

As an example, an IVR system may reside in a data processing systems equipped with special expansion cards that contain digital signal processor (DSP) chips. These specialized processors may connect to a telephone system that switches telephone calls. IVR systems may also be networked, although IVR systems may be present in a stand-alone data processing system or as a client application on an end user machine.

One problem associated with speech applications is correction. Correction is the process of identifying, locating, and replacing incorrect or misrecognized values returned by the speech recognizer. For example, a user is prompted to speak some piece of information by a prompt player device, which is driven by a dialog manager. The user speaks into a microphone device and the speech recognizer receives the speech signal, decodes it, and extracts the spoken piece of information, which is then sent to the dialog manager. The dialog manager interprets the information received from the speech recognizer and instructs the prompt playing device to play the next prompt. The next prompt could be, for example, a request for some other piece of information, a confirmation, or correction or reentry of the current piece of information.

In an IVR, the input of the user is prone to being misrecognized. This may be due to the nature of the speech recognition device, for example. Typical speech applications take these mistakes into consideration and make use of mechanisms that indicate when and where a possible misrecognition has taken place. Correction mechanisms are then used to correct and possibly re-capture the piece of information until the system is confident that a correct value is received from the speech recognition engine.

Typically, correction mechanisms are activated when the dialog manager has poor confidence in information received from the speech recognizer. A typical process implemented in many systems involves two or more steps. The first step is to identify the intention to correct as well as the attribute to be changed. The second step is to capture a new value for the attribute. For example, consider the following interaction:

System: Where would you like to make the payment?
User: In Austin correction turn 1
System: Was that Boston?
User: No.
correction turn 2
System: Let's try again. Where would you like to make the payment?
User: Austin
next information prompt
System: Got it! And how much would you like to pay?
User: Two hundred dollars In the above example, the user has to go through two additional interaction turns compared to a case where the system does not make any mistake.

SUMMARY OF THE INVENTION

The present invention recognizes the disadvantages of the prior art and provides a one-step correction mechanism. Correction of a previous state is enabled simultaneously with recognition in a current or subsequent state. An application is decomposed into a set of tasks. Each task is associated with the collection of one piece of information. Each task may be in a different state. At any point during the interaction, while a task/state pair is active, the dialog manager may enable multiple other task/state pairs to be active in latent fashion. The application developer may then use those facilities or resources to the active task/state and the latent task/state pairs depending on contextual condition of the interaction state of the application.

BRIEF DESCRIPTION OF THE DRAWINGS

The invention itself, as well as a preferred mode of use, further objectives and advantages thereof, will best be understood by reference to the following detailed description of an illustrative embodiment when read in conjunction with the accompanying drawings, wherein:

FIG. 3 is a block diagram of a data processing system that may be implemented as a server in accordance with exemplary aspects of the present invention;

FIGS. 4A-4C depict task/state configurations for an example application in accordance with exemplary aspects of the present invention;

FIG. 7 is a flowchart illustrating the operation of an interactive voice system in accordance with exemplary aspects of the present invention.

DETAILED DESCRIPTION OF THE PREFERRED EMBODIMENT

Figure 1:
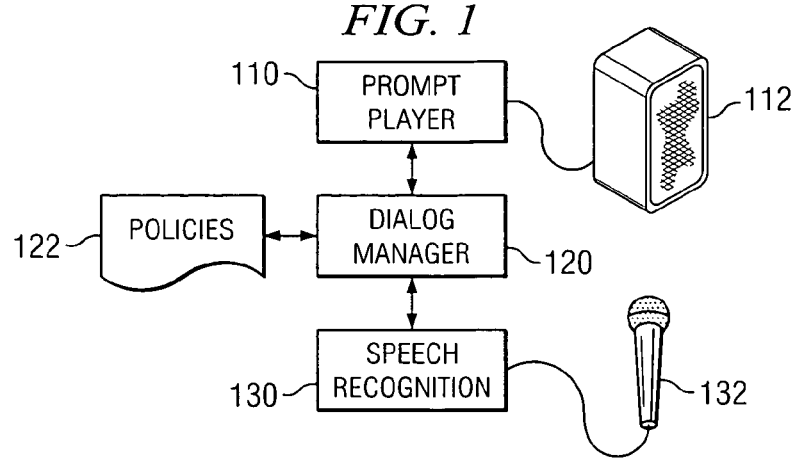
FIG. 1 is a pictorial representation of an interactive voice system in which the exemplary aspects of the present invention may be implemented.
Figure 2:
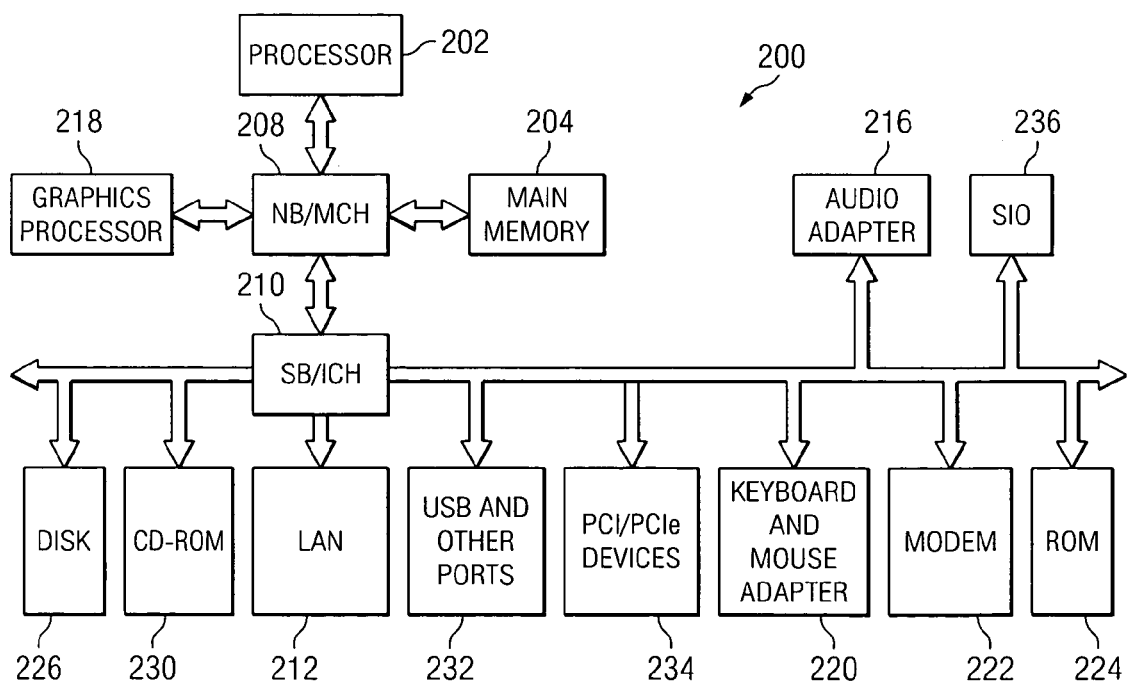
FIG. 2 is a block diagram of a data processing system in which the exemplary aspects of the present invention may be implemented.

A method, apparatus, and computer program product for providing one-step correction in computer voice interaction are provided. The following FIGS. 1-3 are provided as exemplary diagrams of data processing environments in which the exemplary aspects of the present invention may be implemented. It should be appreciated that FIGS. 1-2 are only exemplary and are not intended to assert or imply any limitation with regard to the environments in which the exemplary aspects of the present invention may be implemented. Many modifications to the depicted environments may be made without departing from the spirit and scope of the exemplary embodiments described herein.

With reference now to the figures and in particular with reference to FIG. 1, a pictorial representation of an interactive voice system in which the exemplary aspects of the present invention may be implemented is depicted. A user is prompted to speak some piece of information by prompt player device 110, which is driven by dialog manager 120. The user hears the prompt from speaker 112 and speaks into microphone device 132. Speech recognizer 130 receives the speech signal from microphone 132, decodes it, and extracts the spoken piece of information, which is then sent to dialog manager 120. Dialog manager 120 interprets the information received from speech recognizer 130 and instructs prompt playing device 110 to play the next prompt via speaker 110.

The next prompt could be, for example, a request for some other piece of information, a confirmation, or correction or reentry of the current piece of information. In an IVR system, the input of the user is prone to being misrecognized. This may be due to the nature of speech recognition device 130, for example. Typical speech applications take these mistakes into consideration and make use of mechanisms that indicate when and where a possible misrecognition has taken place. Correction mechanisms are then used to correct and possibly re-capture the piece of information until the system is confident that a correct value is received from the speech recognition engine.

In the prior art, correction mechanisms are activated when dialog manager 110 has poor confidence in information received from speech recognizer 130. A typical process implemented in many systems involves two or more steps. The first step is to identify the intention to correct as well as the attribute to be changed. The second step is to capture a new value for the attribute. Again, consider the following interaction:

| | |
|---|---|
| System: | Where would you like to make the payment? |
| User: | In Austin |
| correction turn 1 | |
| System: | Was that Boston? |
| User: | No. |
| correction turn 2 | |
| System: | Let's try again. Where would you like to make the payment? |
| User: | Austin |
| next information prompt | |
| System: | Got it! And how much would you like to pay? |
| User: | Two hundred dollars |

In the above example, the user has to go through two additional interaction turns compared to a case where the system does not make any mistake.

In accordance with exemplary aspects of the present invention, a one-step correction mechanism is employed. Consider, for example, the following interaction:

| | |
|---|---|
| System: | Where would you like to make the payment? |
| User: | In Austin |
| System: | OK, Boston. And how much would you like to pay? |
| User: | No. I said Austin. |
| System: | Austin. Got it! And how much would you like to pay? |
| User: | Two hundred dollars |

In the above example, dialog manager 120 facilitates the creation of one-step correction by enabling correction of a previous state simultaneously with recognition in a current or subsequent state. An application is decomposed into a set of tasks. Each task is associated with the collection of one piece of information. Each task may be in a different state. At any point during the interaction, while a task/state pair is active, the dialog manager may enable multiple other task/state pairs to be active in latent fashion. The application developer may then use those facilities or resources to the active task/state and the latent task/state pairs depending on contextual condition of the interaction state of the application.

Dialog manager 120 also includes facilities for receiving runtime policies 122 that the application developer may use to specify active task/state pairs and latent task/state pairs. Policies 122 may include, for example, a number of latent states that may be active. More particularly, a different set of latent states may be specified for each active state. In addition, policies 122 may specify the number of times a latent sate may be corrected before a failure handler is invoked. Policies 122 may be stored as a file, such as a text file or markup language file. More specifically, policies 122 may be stored in an extensible markup language (XML) file or the like.

With reference now to FIG. 2, a block diagram of a data processing system is shown in which the exemplary aspects of the present invention may be implemented. Data processing system 200 is an example of a stand-alone computer or an end user's computer, in which code or instructions implementing the exemplary processes of the present invention may be located. In the depicted example, data processing system 200 employs, for example, a hub architecture including a north bridge and memory controller hub (MCH) 208 and a south bridge and input/output (I/O) controller hub (ICH) 210. Processor 202, main memory 204, and graphics processor 218 are connected to MCH 208 in the depicted example. Graphics processor 218 may be connected to the MCH through an accelerated graphics port (AGP), for example.

In the illustrated example, local area network (LAN) adapter 212, audio adapter 216, keyboard and mouse adapter 220, modem 222, read only memory (ROM) 224, hard disk drive (HDD) 226, CD-ROM driver 230, universal serial bus (USB) ports and other communications ports 232, and PCI/PCIe devices 234 may be connected to ICH 210. PCI/PCIe devices may include, for example, Ethernet adapters, add-in cards, PC cards for notebook computers, etc. PCI uses a cardbus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to ICH 210.

An operating system runs on processor 202 and is used to coordinate and provide control of various components within data processing system 200 in FIG. 2. The operating system may be, for example, a commercially available operating system such as the Windows XP™ operating system, which is available from Microsoft Corporation. An object oriented programming system, such as the Java™ programming language, may run in conjunction with the operating system and provides calls to the operating system from Java™ programming language programs or applications executing on data processing system 200. "JAVA" is a trademark of Sun Microsystems, Inc. Instructions for the operating system, the object-oriented programming system, and applications or programs are located on storage devices, such as hard disk drive 226, and may be loaded into main memory 204 for execution by processor 202. The exemplary processes of the present invention may be performed by processor 202 using computer implemented instructions, which may be located in a memory such as, for example, main memory 204, memory 224, or in one or more peripheral devices 226 and 230.

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2.

Also, the exemplary aspects of the present invention may be applied to a multiprocessor data processing system.

Referring to FIG. 3, a block diagram of a data processing system that may be implemented as a server is depicted in accordance with exemplary aspects of the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI local bus 316. Typical PCI bus implementations will support four PCI expansion slots or add-in connectors. Communications links to clients may be provided through modem 318 and network adapter 320 connected to PCI local bus 316 through add-in connectors.

Additional PCI bus bridges 322 and 324 provide interfaces for additional PCI local buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention. The data processing system depicted in FIG. 3 may be, for example, an IBM eServer™ pSeries® system, a product of International Business Machines Corporation in Armonk, N.Y., running the Advanced Interactive Executive (AIX™) operating system or Linux™ operating system. "LINUX" is a trademark of Linus Torvalds.

In accordance with exemplary aspects of the present invention, an application designer specifies the call flow of the application determining the flow of task/state pairs based on contextual conditions. For example, execute task/state pair A/c, then, if it returns a correct result, execute B/c, otherwise execute A/r. Then, the developer designs and implements grammars for each task/state pair.

During the development of the application dialog management strategy, the developer associates active task/state pairs with latent task/state pairs depending on the call-flow. At runtime, when the end user produces an utterance, the grammar will be a combination of the active task/state and the latent task/state grammars. The latent task/state grammars include patterns of speech that include, for example, "no," "I meant," "that's not right," and the like. On the other hand, the grammar for the active state expects a simple expression defining a value for the active state.

The exemplary aspects of the present invention may be embodied, for example, in dialog manager 120 in FIG. 1. Speech recognition component 130 receives speech from microphone 132. Prompt playing component 110 presents audible prompts to the user through speaker 112. Dialog manager 120 then manages the task/state pairs and provides one-step correction by receiving information input from speech recognition component 130 and providing prompts through prompt playing component 110. The interactive voice system of FIG. 1 may be embodied on a stand-alone data processing system or end-user data processing system, such as data processing system 200 in FIG. 2, or a server data processing system, such as data processing system 300 in FIG. 3.

With reference now to FIGS. 4A-4C, task/state configurations for an example application are shown in accordance with exemplary aspects of the present invention. More particularly, with reference to FIG. 4A, an application is realized by a collection of tasks, each task represented, for instance, by a software component. Each component implements the interaction that needs to take place in order to capture a certain value. In the depicted example, the application may be a book store application with the following components (i.e. tasks): an author component 410, a book name component 420, a quantity component 430, and a payment method component 440.

A component may implement multiple turns with the user in order to achieve its goal, i.e. the return of a valid value. The turns correspond to the different states in which a component can be. For example, a component needs to capture the information, validate the information, confirm the information, correct the information, if necessary, and repeat the information back to the user. Each one of these is a state of the component. FIG. 4B illustrates a possible topology for an example component, author component 410.

In the depicted example, component 410 may be in the input state, the confirmation state, the correction state, or the echo state. In the input state, the component receives spoken information. From the input state, the component goes to the confirmation state where the component confirms the validity of the information. From the confirmation state, the component may go to the echo state to repeat the information back to the user or the correction state to correct the information.

The interactive voice system of FIG. 1 may receive the information needed to implement the interaction with the user in the form of a markup language document. For example, the interactive voice system may be an extensible markup language (XML) voice browser, or, more specifically, a VoiceXML browser, and interaction may be expressed in terms of forms and fields where, in general, the fields correspond to the component states described above. In general, for each field a prompt is played to the user and, if input is expected, a grammar is associated with the field.

Currently, component frameworks for voice applications, such as reusable dialog components (RDC's), associate a single input grammar with the input state of the component. RDC's form a framework for creating Java™ server page (JSP) tag libraries that aid in rapid development of voice and multimodal applications. The input, confirmation, correction, and echo states are typically executed in sequence (input first, then confirm, then correct, if necessary, and then echo). The confirmation step is typically implemented using a generic confirmation grammar, which is typically a "yes/no" grammar. Thus, for the above three components of the example book store application, the sequence of interactions with the user based on the tasks and associated grammars would be as shown in FIG. 4C.

Figure 5A:
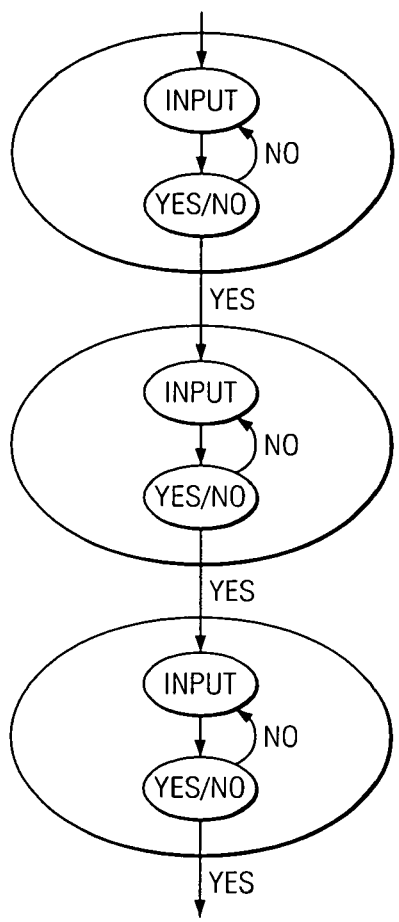
FIG. 5A is a graph illustrating the activation sequence of the grammars of three components using the assumption that the grammar for correction is the same as the grammar for input.

Each node of the graph shown in FIG. 4C represents a task/state pair. For instance, the first node on the left is Author/input, the second is Author/confirm, and so forth. In a current system, the correction and the input state use the same grammars; thus, one can see that the correction step is in fact a repetition of the input step if confirmation is negative. FIG. 5A is a graph illustrating the layout of the grammars of three components using the assumption that the grammar for correction is the same as the grammar for input.

Figure 5B:
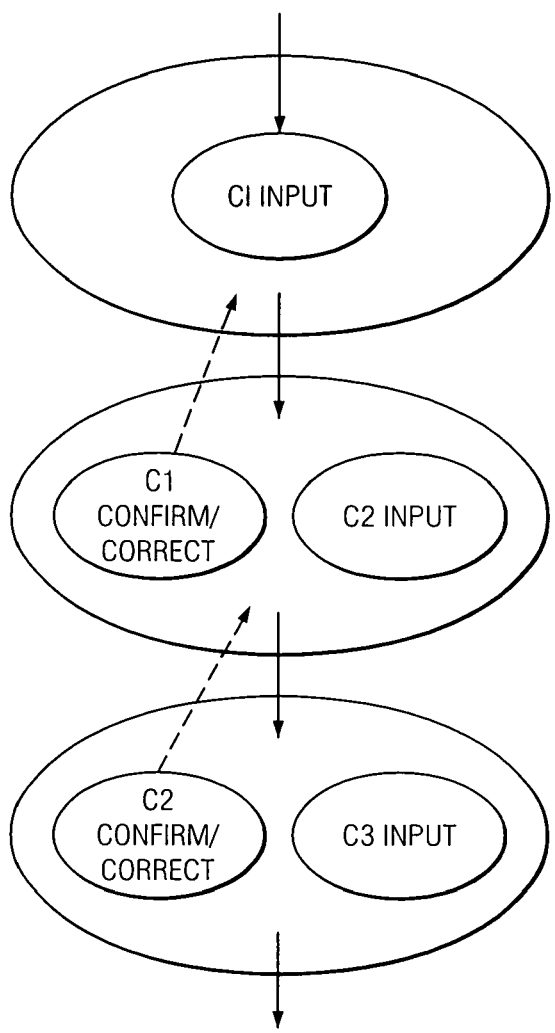
FIG. 5B is a graph illustrating the activation sequence of the grammars of three components with component-specific correction grammars in accordance with exemplary aspects of the present invention.

In accordance with exemplary aspects of the present invention, each component implements a component-specific correction grammar in addition to an input grammar. The correction grammar for a given component is responsible for carrying out the detection of an error, the detection of the intention to correct by the user, and the capture of a new value. FIG. 5B is a graph illustrating the layout of the grammars of three components with component-specific correction grammars in accordance with exemplary aspects of the present invention. In the depicted example, let C1 be the first component and "C1 input" is the input state grammar. In the C2 component, "C1 confirm/correct" is the correction state grammar for the C1 component and "C2 input" is the input state grammar. Also, in the C3 component, "C2 confirm/correct" is the correction state grammar for the C2 component and "C3 input" is the input state grammar.

The interaction may be as follows:

1. The system prompts for C1 and enables "C1 input."
2. The user inputs C1 and the system proceeds to the second component.
3. The system tells the user that it thinks it heard the value for C1 and prompts for C2. At this moment, the system not only enables the "C2 input" grammar, but also enables the "C1 confirm/correct" grammar.
4. If the system captured the correct value for C1, then the user will say the value of C2 and the "C2 input" grammar will be triggered. If the user expresses disagreement with the value of C1 and corrects the value, then the grammar "C1 confirm/correct" is triggered instead and the new value of C1 will replace the previous value.

In other words, for the user, the active, visible states are "C1 input," "C2 input," and so on, but there may be one or more invisible or latent states that have corresponding grammars enabled, which may be triggered by user utterances.

Thus, the dialog manager may use latent states in voice interaction. For example, when a user is presented with a given prompt, reflecting a certain component and state (e.g., the input state of a Book Name task), the prompt might be indirectly referring to information that might trigger a latent component (e.g., the confirmation and correction states of the Author task. Consider the following example:

---

System (Author/input): What is the book's author?
User: William Shakespeare
System (Book Name/input (Author/correct)): And what book by William Shatner are you looking for?
User (Author/correct): Actually, I wanted a book by William Shakespeare.
System: My mistake. What book by William Shakespeare are you looking for?
...

---

Such latent states can be enabled not only one at a time, but also in groups of several. This allows for very powerful correction mechanisms of multiple tokens of data at the same time.

In one exemplary embodiment of the present invention, the VoiceXML (VXML) Mixed Initiative feature may be used where, at any given point in the interaction, the markup may consist of a VXML MI frame with one initial prompt and grammar and multiple fields. The initial prompt and grammar is meant to capture multi-token utterances. For example, "I mean Wilde, and the book is the Picture of Dorian Gray." The fields consist of the union set of latent states. One can perceive the markup now as a bi-dimensional structure in which one dimension represents time (interaction points) and the second dimension represents the visible and latent states that are active at each point in the interaction.

Figure 6:
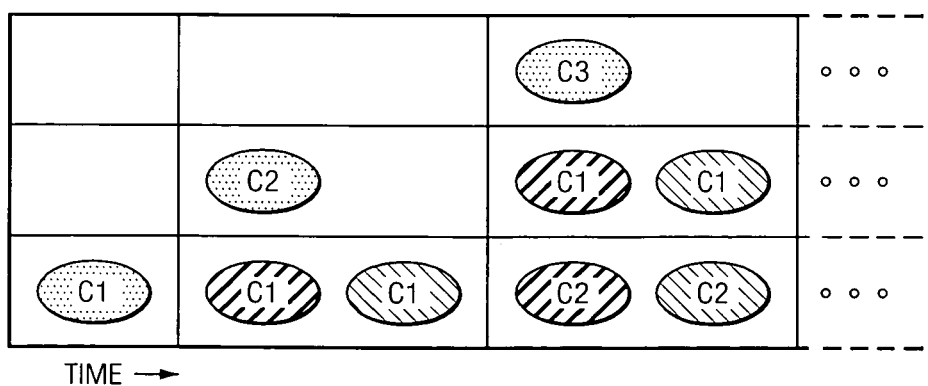
FIG. 6 illustrates a bi-dimensional graph of time versus active and latent states in accordance with exemplary aspects of the present invention.

FIG. 6 illustrates a bi-dimensional graph of time versus active and latent states in accordance with exemplary aspects of the present invention. In the first interaction, "C1 input" is the active state. In the second interaction, "C2 input" is the active state and "C1 confirm" and "C1 correct" are latent states. In the third interaction, "C3 input" is the active state and "C1 confirm," "C1 correct," "C2 confirm," and "C2 correct" are latent states, and so forth.

Thus, the exemplary aspects of the present invention allow for the existence of a distinctive state grammar associated with each internal state of an application task, the existence of latent states, enabled by the dialog management strategy, in addition to the main active state of a task, and provides facilities to specify runtime policies that the application developer may use to specify active task/state pairs and latent task/state pairs.

FIG. 7 is a flowchart illustrating the operation of an interactive voice system in accordance with exemplary aspects of the present invention. Operation begins and a determination is made as to whether an exit condition exists (block 702). An exit condition may exist, for example, when the interactive voice application is shut down or the user ends voice interaction. If an exit condition exists, operation ends.

If an exit condition does not exist in block 702, the interactive voice system prompts for input for the active state (block 704). After receiving input from the user (block 706), the interactive voice system determines whether the user input complies with the grammar for the active state or the latent state grammar (block 708). The latent state grammar includes patterns of speech that include, for example, "no," "not," "I meant," "that's not right," and the like. On the other hand, the grammar for the active state expects a simple expression defining a value for the active state. When input is received for a latent state, a correction is made to the latent state, but the interactive voice system remains in the active state and continues to prompt the user for the active state until input is received for the active state.

In addition, the interactive voice system may be capable of receiving input for two or more states at the same time. For example, the interactive voice system may prompt the user as follows: "Ok, Austin. What is the desired departure time?" The user may respond with the following: "Not Austin, Boston, and the departure time is five o'clock." Thus, the operation may proceed in multiple paths from block 708. Alternatively, the interactive voice system may ignore input for the active state until all latent states are correct.

If input for the active task/state pair is received, the interactive voice system updates the next active and latent states (block 710), and operation returns to block 702 to determine whether an exit condition exists. However, responsive to a determination that input for a latent state is received in block 708, the interactive voice system determines whether the number of corrections made to the latent state is equal to one (block 712). The interactive voice system determines the number of corrections for a given latent state to prevent infinite loops or simply an unreasonable number of corrections. During a first correction, the interactive voice system may update a latent state within the normal flow of operation with one-step correction. Therefore, if the number of corrections for the particular latent state is equal to one, then the interactive voice system updates the latent state value (block 714) and increments the value of the number of latent state corrections (block 716). Thereafter, operation returns to block 702 to determine whether an exit condition exists.

However, if the latent state corrections are not equal to one in block 712, then the user has already performed on-step correction of the state value one time. The user may get quite frustrated if more than a few corrections are required. Therefore, the interactive voice system may set a maximum number of corrections permitted before passing control to a failure handler. While the number of corrections is less than the maximum value, the interactive voice system may offer explicit confirmation of the latent state value, rather than one-step correction. Thus, the interactive voice system determines whether the number of latent state corrections is less than a maximum value, max (block 718). If the number of latent state corrections is less than max, then the interactive voice system performs latent state explicit confirmation (block 720) and increments the value of the number of latent state corrections (block 716). Thereafter, operation returns to block 702 to determine whether an exit condition exists. If, however, the latent state corrections are not less than max in block 718, then the interactive voice system invokes a failure handler and operation ends. The value of max may depend upon the application of the interactive voice system and the complexity of the subject matter. While one implementation of the interactive voice system may expect a piece of data to be correct after three corrections at the most, another more complex implementation may expect up to ten or more corrections.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in an interactive voice response system, for processing corrections in a voice interaction, the method comprising:
   receiving first information from a first input spoken by a user for a first interaction state;
   prompting the user for second information for a second interaction state;
   in response to receiving a second input spoken by the user that complies with a latent state grammar for the first interaction state,
      correcting the first information in accordance with the second input, and
      providing a first correction confirmation and a re-prompting of the user for the second information within a single interaction prompt; and
   in response to receiving a third input that is spoken by the user after the second input and that complies with the latent state grammar for the first interaction state,
      correcting the first information in accordance with the third input,
      providing a second correction confirmation, and
      after receiving a user acceptance of the second correction confirmation, re-prompting the user for the second information.

2. The method of claim 1, wherein providing the first correction confirmation comprises echoing the corrected first information.

3. The method of claim 1, wherein the third input is a next input spoken by the user after the second input.

4. The method of claim 1, further comprising invoking a failure handler in response to receiving a fourth input that is spoken by the user after the third input and that complies with the latent state grammar for the first interaction state.

5. The method of claim 1, further comprising:
   if the second input complies with an active state grammar for the second interaction state, prompting the user for third information for a third interaction state.

6. The method of claim 5, wherein prompting the user for the third information comprises echoing the second information.

7. An apparatus for processing corrections in a voice interaction with an interactive voice response system, the apparatus comprising:
   a speech recognizer;
   a prompt player; and
   a dialog manager configured to:
      receive from the speech recognizer first information from a first input spoken by a user for a first interaction state;
      prompt the user via the prompt player for second information for a second interaction state; and
      in response to receiving a second input spoken by the user that complies with a latent state grammar for the first interaction state,
         correct the first information in accordance with the second input, and provide a first correction confirmation and a re-prompting of the user for the second information within a single interaction prompt via the prompt player; and in response to receiving a third input that is spoken by the user after the second input and that complies with the latent state grammar for the first interaction state,
correct the first information in accordance with the third input,
provide a second correction confirmation, and
after receiving a user acceptance of the second correction confirmation, re-prompt the user via the prompt player for the second information.

8. The apparatus of claim 7, wherein the dialog manager is configured to provide the first correction confirmation by echoing the corrected first information.

9. The apparatus of claim 7, wherein the dialog manager is configured to receive the third input as a next input spoken by the user after the second input.

10. The apparatus of claim 7, wherein the dialog manager is further configured to invoke a failure handler in response to receiving a fourth input that is spoken by the user after the third input and that complies with the latent state grammar for the first interaction state.

11. The apparatus of claim 7, wherein the dialog manager is further configured to:
if the second input complies with an active state grammar for the second interaction state, prompt the user via the prompt player for third information for a third interaction state.

12. The apparatus of claim 11, wherein the dialog manager is further configured to:
if the second input complies with the active state grammar for the second interaction state, echo the second information.

13. At least one computer-readable storage medium encoded with a plurality of computer-executable instructions that, when executed, perform a method comprising:
receiving first information from a first input spoken by a user for a first interaction state;
prompting the user for second information for a second interaction state;
in response to receiving a second input spoken by the user that complies with a latent state grammar for the first interaction state,
correcting the first information in accordance with the second input, and
providing a first correction confirmation and a re-prompting of the user for the second information within a single interaction prompt; and
in response to receiving a third input that is spoken by the user after the second input and that complies with the latent state grammar for the first interaction state,
correcting the first information in accordance with the third input,
providing a second correction confirmation, and
after receiving a user acceptance of the second correction confirmation, re-prompting the user for the second information.

14. The at least one computer-readable storage medium of claim 13, wherein providing the first correction confirmation comprises echoing the corrected first information.

15. The at least one computer-readable storage medium of claim 13, wherein the third input is a next input spoken by the user after the second input.

16. The at least one computer-readable storage medium of claim 13, wherein the method further comprises invoking a failure handler in response to receiving a fourth input that is spoken by the user after the third input and that complies with the latent state grammar for the first interaction state.

17. The at least one computer-readable storage medium of claim 13, wherein the method further comprises:
if the second input complies with an active state grammar for the second interaction state, prompting the user for third information for a third interaction state.

18. The at least one computer-readable storage medium of claim 17, wherein prompting the user for the third information comprises echoing the second information.

* * * * *